(12) United States Patent
Winkler et al.

(10) Patent No.: US 10,739,778 B2
(45) Date of Patent: Aug. 11, 2020

(54) METHOD AND DEVICE FOR CONTROLLING A TRAJECTORY PLANNING PROCESS OF AN EGO-VEHICLE

(71) Applicant: Bayerische Motoren Werke Aktiengesellschaft, Munich (DE)

(72) Inventors: Franz Winkler, Munich (DE); Christoph Hellfritsch, Unterschleissheim (DE); Christian Rathgeber, Munich (DE); Cristina Menendez, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 156 days.

(21) Appl. No.: 15/974,234

(22) Filed: May 8, 2018

(65) Prior Publication Data

US 2018/0253103 A1 Sep. 6, 2018

Related U.S. Application Data

(63) Continuation of application No. PCT/EP2016/072801, filed on Sep. 26, 2016.

(30) Foreign Application Priority Data

Nov. 9, 2015 (DE) .......................... 10 2015 221 920

(51) Int. Cl.
*G05D 1/02* (2020.01)
*B60W 30/16* (2020.01)
(Continued)

(52) U.S. Cl.
CPC ........... *G05D 1/0223* (2013.01); *B60W 30/16* (2013.01); *B60W 50/0097* (2013.01);
(Continued)

(58) Field of Classification Search
CPC ... G05D 1/0223; G05D 1/0088; B60W 30/16; B60W 50/009
(Continued)

(56) References Cited

U.S. PATENT DOCUMENTS 5,173,859 A 12/1992 Deering
10,547,941 B1 * 1/2020 Herman .................. H04R 3/04
(Continued)

FOREIGN PATENT DOCUMENTS

DE 691 23 947 T2 4/1997
DE 100 17 662 A1 10/2001
(Continued)

OTHER PUBLICATIONS

German Search Report issued in counterpart German Application No. 10 2015 221 920.8 dated Aug. 23, 2016 with partial English-language translation (Seventeen (17) pages).
(Continued)

*Primary Examiner* — Muhammad Shafi
(74) *Attorney, Agent, or Firm* — Crowell & Moring LLP

(57) ABSTRACT

A method for controlling a trajectory planning process of an ego-vehicle includes the following steps: determining a longitudinal movement of the ego-vehicle, the longitudinal movement including a speed of the ego-vehicle; determining a longitudinal movement of an object, the longitudinal movement including a speed of the object; calculating a target trajectory of the object on the basis of a predicted trajectory of the object; calculating an end time of a maneuvering process of the ego-vehicle, the end time of the maneuvering process being a point in time at which a differential speed between the ego-vehicle and the object is dissipated; calculating a distance between a position of the ego-vehicle and the position of a third-party vehicle with respect to the calculated target trajectory at the calculated (Continued)

end time of the maneuvering process of the ego vehicle; and if the calculated distance of the ego-vehicle at the calculated end time of the maneuvering process equals a specified threshold or falls below a specified threshold: setting the specified speed of the object as the target speed of the ego-vehicle and transmitting the target speed to the trajectory planning process in order to calculate a following trajectory for the ego-vehicle.

12 Claims, 4 Drawing Sheets

(51) Int. Cl.
*B60W 50/00* (2006.01)
*G05D 1/00* (2006.01)
*B60W 50/06* (2006.01)

(52) U.S. Cl.
CPC ..... *G05D 1/0088* (2013.01); *B60W 2050/065* (2013.01); *B60W 2520/10* (2013.01); *B60W 2520/105* (2013.01); *B60W 2554/4041* (2020.02); *B60W 2554/801* (2020.02); *B60W 2554/804* (2020.02); *B60W 2720/10* (2013.01)

(58) Field of Classification Search
USPC .......................................................... 701/25
See application file for complete search history.

(56) References Cited

U.S. PATENT DOCUMENTS

| | | | |
|---|---|---|---|
| 2002/0135507 A1* | 9/2002 | Winner | ..................... B60T 7/22 342/70 |
| 2009/0143932 A1* | 6/2009 | Sekiya | ................. G05D 1/0246 701/26 |
| 2013/0335553 A1* | 12/2013 | Heger | .................... B60Q 9/008 348/118 |

FOREIGN PATENT DOCUMENTS

| | | |
|---|---|---|
| DE | 10 2004 027 983 A1 | 4/2005 |
| DE | 10 2004 029 371 A1 | 1/2006 |
| DE | 10 2014 215 980 A1 | 2/2016 |

OTHER PUBLICATIONS

International Search Report (PCT/ISA/210) issued in PCT Application No. PCT/EP2016/072801 dated Dec. 12, 2016 with English-language translation (Six (6) pages).

German-language Written Opinion (PCT/ISA/237) issued in PCT Application No. PCT/EP2016/072801 dated Dec. 12, 2016 (Nine (9) pages).

* cited by examiner

METHOD AND DEVICE FOR CONTROLLING A TRAJECTORY PLANNING PROCESS OF AN EGO-VEHICLE

CROSS REFERENCE TO RELATED APPLICATIONS

This application is a continuation of PCT International Application No. PCT/EP2016/072801, filed Sep. 26, 2016, which claims priority under 35 U.S.C. § 119 from German Patent Application No. 10 2015 221 920.8, filed Nov. 9, 2015, the entire disclosures of which are herein expressly incorporated by reference.

BACKGROUND AND SUMMARY OF THE INVENTION

The invention relates to a method for controlling a trajectory planning process of a vehicle, in particular an ego-vehicle. The invention also relates to a computer program product, a device and a vehicle equipped with the device for controlling a trajectory planning process of an ego-vehicle.

Future driver assistance systems can provide a driver with greater assistance than current rule-based systems by exactly planning the trajectory to be traveled. Current control-oriented solutions of an active cruise control system of vehicles usually use only one controller which can be parameterized differently depending on a situation. For highly automated driving functions, it may be absolutely necessary to exactly plan the trajectory to be traveled. However, a process of planning a convenient trajectory which can be implemented by the vehicle may be associated with considerable computational complexity. The computational complexity may be considerably increased further if, for example, trajectories for different travel modes have to the calculated and evaluated by the trajectory planning process. This computational complexity may be so high that the trajectory cannot be calculated in control devices of the vehicle or can be calculated only with a considerable delay.

Therefore, an object of the invention is to efficiently improve control of a trajectory planning process of a vehicle, in particular an ego-vehicle.

According to one aspect, the invention is distinguished by a method for controlling a trajectory planning process of a vehicle, in particular an ego-vehicle. The method comprises determining a longitudinal movement of the ego-vehicle, the longitudinal movement including a speed of the ego-vehicle. The method also comprises determining a longitudinal movement of an object, the longitudinal movement including a speed of the object. The object is preferably a vehicle, for example a motor vehicle or a motorcycle. The method comprises calculating a target trajectory of the object on the basis of a predicted trajectory of the object. A predicted trajectory is a trajectory which is predetermined or precalculated using a movement model of the object, for example. For this purpose, it is possible to make assumptions with regard to an acceleration, a speed and/or a position of the object. A target trajectory may comprise, for example, a safety distance which must be complied with between the object and the ego-vehicle at the end of a maneuver, in particular a predefined maneuver. The method also comprises calculating an end time of a maneuver of the ego-vehicle, the end time of the maneuver being a time at which a differential speed between the ego-vehicle and the object has decreased. The method comprises calculating a distance between a position of the ego-vehicle and a position of the third-party vehicle with respect to the calculated target trajectory at the calculated end time of the maneuver of the ego-vehicle, and, if the calculated distance of the ego-vehicle at the calculated end time of the maneuver is equal to a predefined threshold value or undershoots a predefined threshold value, setting the determined speed of the object as the target speed of the ego-vehicle, and transferring or transmitting the target speed to a trajectory planning process for calculating a follow-on travel trajectory for the ego-vehicle. The predefined threshold value may be a predefined safety distance. The predefined safety distance may be dynamic and/or static. For example, the predefined safety distance may be determined on the basis of the speed of the object and/or of the ego-vehicle. The threshold value may be determined by use of a hysteresis function, in particular by a hysteresis function of the safety distance. Calculating the predefined threshold value by use of a hysteresis function can prevent continuous toggling between free travel and follow-on travel. As a result, the ego-vehicle can be controlled with a greater degree of convenience.

Determining an end time and calculating a distance at the determined end time advantageously make it possible to efficiently determine whether the ego-vehicle can carry out a maneuver in free travel or in follow-on travel. If the distance at the end time is equal to a predefined threshold value or undershoots a predefined threshold value, the target speed of the ego-vehicle can be selected only up to at most the speed of the object in order to prevent a safety distance from being undershot and/or to prevent a collision with an object moving in front of the ego-vehicle, for example. In the event of a calculated distance which is equal to a predefined threshold value or undershoots a predefined threshold value, the ego-vehicle can change over from a free travel mode to a follow-on travel mode at the current time. The ego-vehicle can therefore predictively anticipate a possible future movement of the object in the longitudinal direction already at the current time and can react accordingly, for example by selecting the speed of the object as the target speed. A follow-on travel mode of the ego-vehicle can be efficiently and predictively recognized. The trajectory planning process can therefore be efficiently controlled by being able to plan one or more follow-on travel trajectories at the determined target speed. Further trajectories, in particular free travel trajectories, need not be calculated by the trajectory planning process since it was determined, before starting the trajectory planning process, that the ego-vehicle is in a follow-on travel mode.

According to one advantageous configuration, the predicted trajectory can be determined on the basis of a predefined movement model of the object on the basis of the determined longitudinal movement of the object, and/or the target trajectory can take into account a safety distance to the object, and/or the predefined threshold value can correspond to the safety distance. The predefined movement model makes it possible to efficiently calculate a future behavior of the object in the longitudinal direction. Furthermore, taking a safety distance into account makes it possible to directly include the safety parameters which are conventional in road traffic in the control of the trajectory planning process of the vehicle.

According to another advantageous configuration, the end time of the maneuver can be calculated on the basis of a movement model of the object and a movement model for the ego-vehicle. Using movement models makes it possible to efficiently determine or calculate a future behavior of the ego-vehicle and of the object.

According to another advantageous configuration, the movement model of the object can keep an acceleration of the object constant until a predefined time and can set the acceleration to zero after the predefined time. Furthermore, the movement model of the ego-vehicle can keep a predefined average acceleration of the ego-vehicle until the end time of the maneuver. This makes it possible to calculate a future acceleration behavior for the object and the ego-vehicle with little computational complexity.

According to another advantageous configuration, the position of the ego-vehicle can be calculated by way of the movement model of the ego-vehicle on the basis of the determined longitudinal movement of the ego-vehicle at the end time of the maneuver. Furthermore, the position of the object can be calculated by way of the movement model of the object on the basis of the determined longitudinal movement of the object at the end time of the maneuver. On the basis of the current longitudinal movement of the ego-vehicle and of the object, the position and therefore also the distance at the end time of the maneuver between the ego-vehicle and the object can hereby be easily calculated.

According to another advantageous configuration, the method may comprise receiving a desired speed of the ego-vehicle, and/or, if the desired speed of the ego-vehicle is less than the speed of the object and/or the calculated distance of the ego-vehicle at the calculated end time of the maneuver exceeds a predefined threshold value, for example a predefined safety distance, setting the desired speed as the target speed of the ego-vehicle, and/or, if the desired speed of the ego-vehicle is greater than or equal to the speed of the object and/or the calculated distance of the ego-vehicle at the calculated end time of the maneuver is equal to a predefined threshold value or undershoots a predefined threshold value, setting the speed of the object as the target speed of the ego-vehicle. This makes it possible to efficiently determine free travel or a free travel mode and/or follow-on travel or a follow-on travel mode of the ego-vehicle.

According to another advantageous configuration, the method may also comprise transferring the target speed to a trajectory planning process for calculating a follow-on travel trajectory for the ego-vehicle if the calculated distance of the ego-vehicle at the calculated end time of the maneuver is equal to a predefined threshold value or undershoots a predefined threshold value, and/or transferring the target speed to a trajectory planning process for calculating a free travel trajectory for the ego-vehicle if the desired speed of the ego-vehicle is less than the speed of the object or the calculated distance of the ego-vehicle at the calculated end time of the maneuver exceeds a predefined threshold value. This makes it possible to efficiently control a trajectory planning process. In particular, free travel and the trajectory planning process for free travel can be efficiently determined. As a result, it may no longer be necessary to plan trajectories for both travel modes, free travel and follow-on travel. Consequently, the trajectory planning process can plan the trajectories for only free travel or follow-on travel of the ego-vehicle in a control device in a resource-efficient manner.

According to another aspect, the invention is distinguished by a computer program product for controlling a trajectory planning process of an ego-vehicle, wherein the computer program product comprises instructions which, when executed on a control device or a computer of the ego-vehicle, carry out the method described above.

According to another aspect, the invention is distinguished by a device for controlling a trajectory planning process of an ego-vehicle, wherein the device is designed to carry out the method described above.

According to another aspect, the invention is distinguished by a vehicle equipped with a device for controlling a trajectory planning process of an ego-vehicle, wherein the device is designed to carry out the method described above.

Other objects, advantages and novel features of the present invention will become apparent from the following detailed description of one or more preferred embodiments when considered in conjunction with the accompanying drawings.

One preferred exemplary embodiment of the invention is described below on the basis of the accompanying drawings.

DETAILED DESCRIPTION OF THE DRAWINGS

Irrespective of the optimization method used, calculation of a trajectory which can be traveled may be associated with considerable computational complexity. Implementing the calculation of a trajectory which can be traveled may very quickly reach the limits of the ranges which can be calculated in the vehicle. For this reason, for the purpose of calculating or planning trajectories, it is necessary to take measures to reduce calculation complexity for calculating a trajectory which can be traveled.

Global optimization of a trajectory to be traveled in the entire solution space while complying with all secondary conditions cannot be implemented in control devices of a vehicle since the computational complexity for global optimization may be too high. In order to reduce the computational complexity, a method upstream of the trajectory planning process can be carried out. The aim of the upstream method is to stipulate parameters within which a subsequent trajectory planning process can plan a trajectory to be traveled by a vehicle. In other words, a solution space for the trajectory planning process can be restricted by the upstream method. Trajectories which are not possible can be excluded in this case by the upstream method, with the result that the computational complexity for the downstream trajectory planning process can be efficiently reduced.

In order to describe the position and movement of the driver's own vehicle, also called ego-vehicle, and of other road users, also called object or third-party vehicle below, simplifying assumptions can be made. A solution space can be discretized in the transverse direction within the upstream method. For example, only the centers of traffic lanes can be considered as the target of a trajectory to be calculated. For the time of a lane change, both traffic lanes, that is to say the current traffic lane and the target traffic lane, can be assumed to be occupied.

Figure 1:
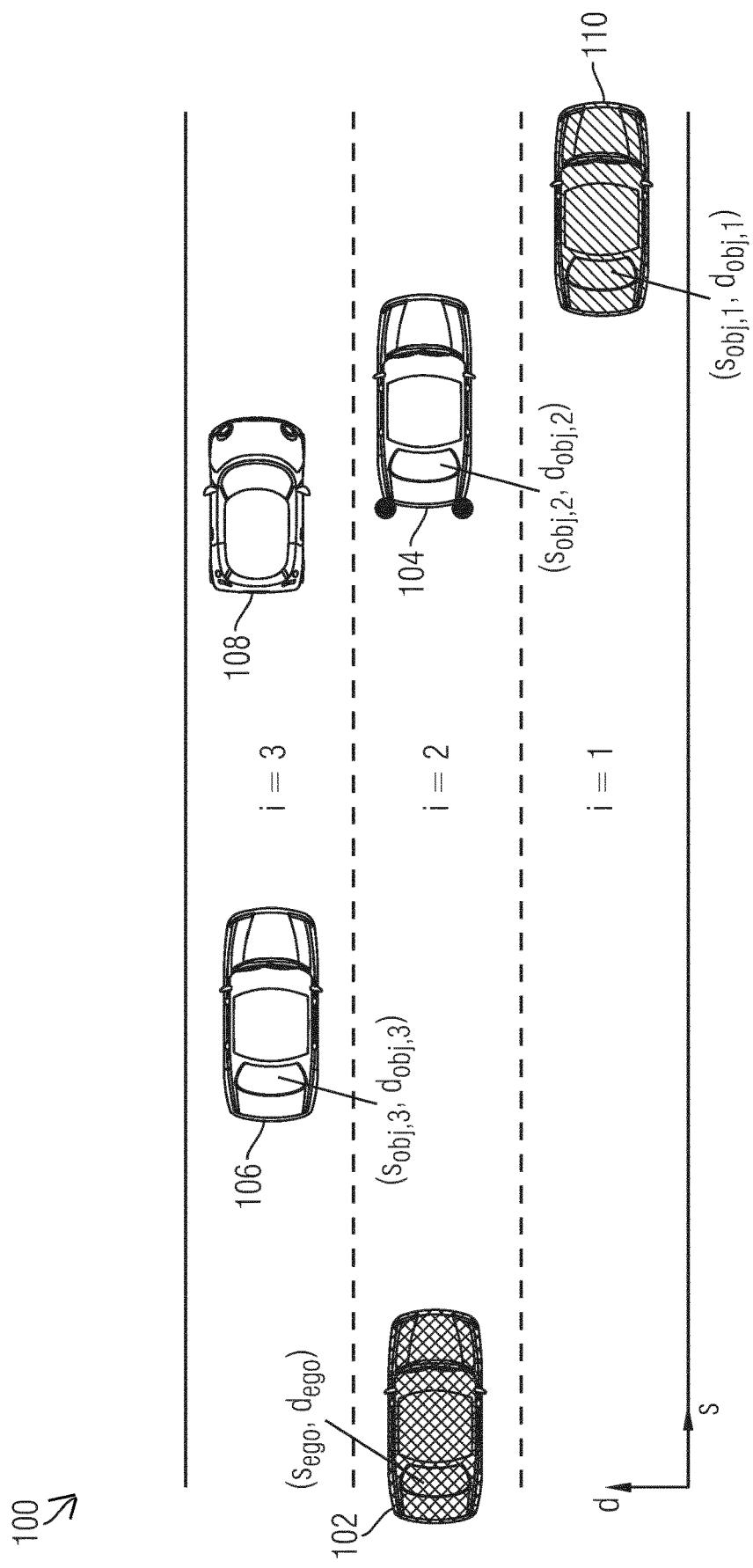
FIG. 1 schematically shows an exemplary traffic situation.

FIG. 1 shows an exemplary traffic situation 100. The vehicle 102 is the ego-vehicle. The vehicles 104, 106 and 108 are third-party vehicles. For better representation, the traffic lanes are numbered from i=1 to i=3. There is no object, for example a further third-party vehicle, in the lane i=1. For this reason, a phantom vehicle 110 in the traffic lane i=1 of the road is assumed. The phantom vehicle 110 can be placed at the edge of the detection range of an environment sensor system of the ego-vehicle 102. Vehicles are therefore present in all lanes of the road.

Figure 2:
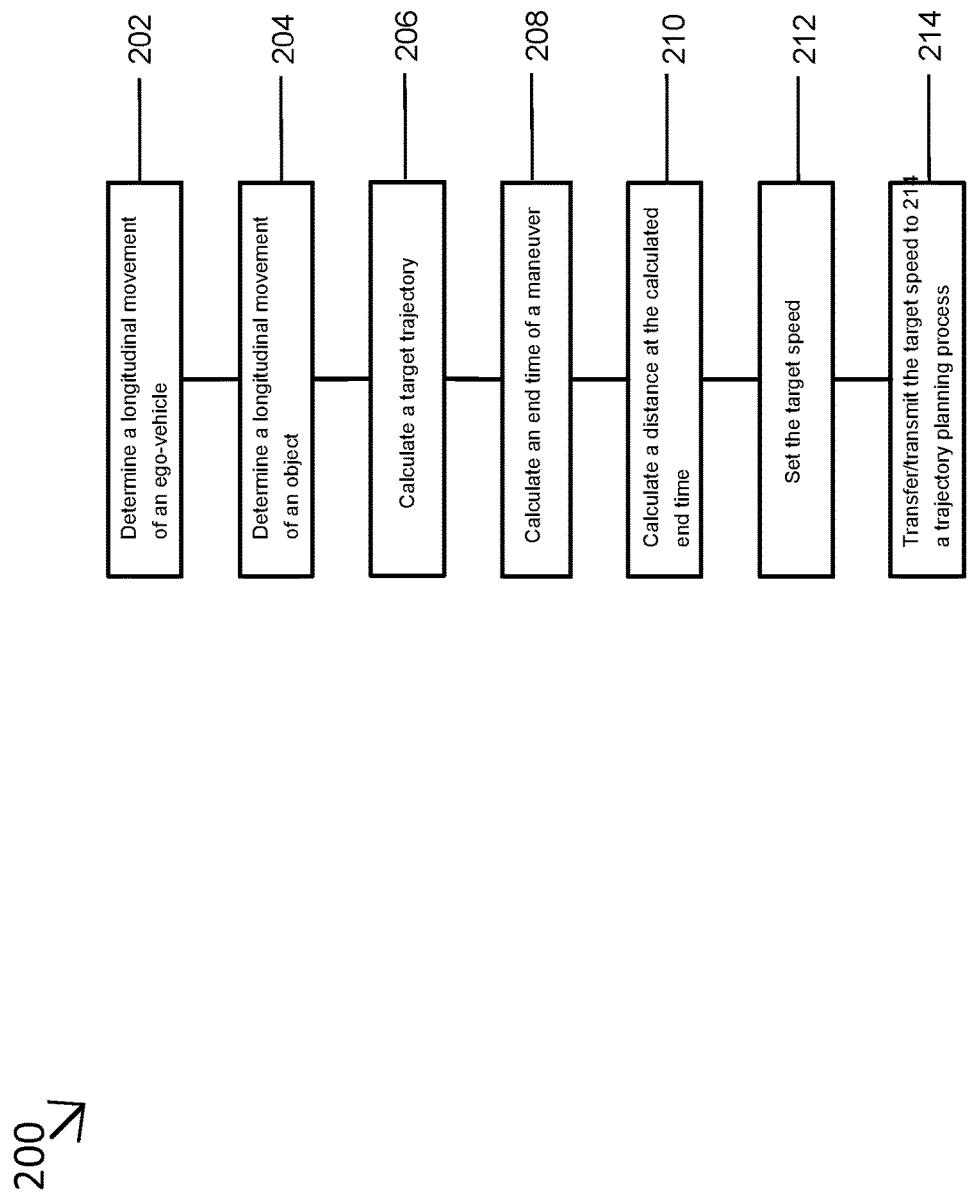
FIG. 2 schematically shows an exemplary method for controlling a trajectory planning process.

FIG. 2 shows an exemplary upstream method 200. On the basis of the upstream method 200, the trajectory planning process can plan a trajectory to be traveled for the ego-vehicle. The upstream method 200 can therefore control the downstream trajectory planning process. The method 200 can preferably be carried out by the ego-vehicle only when there is at least a predefined safety distance to an object traveling in front. If there is no predefined safety distance when carrying out the method, the method 200 cannot be carried out. In this case, the ego-vehicle is in a follow-on travel mode and the downstream trajectory planning process can plan or calculate a follow-on travel trajectory for the ego-vehicle.

The method 200 can determine 202 a longitudinal movement of the ego-vehicle 102 at a current time, for example can measure a longitudinal movement by way of a sensor system of the ego-vehicle 102. The longitudinal movement of the ego-vehicle 102 may comprise an acceleration, a speed and/or a position of the ego-vehicle 102. The method 200 may also determine 204 a longitudinal movement of an object, for example a third-party vehicle 104 to 110, for example can measure a longitudinal movement by use of the sensor system of the ego-vehicle. The longitudinal movement of the object may comprise a position, a speed and/or an acceleration of the object.

The longitudinal movement of the ego-vehicle 102 and of a third-party vehicle can be calculated using a respective movement model. In detail, the longitudinal movement of the third-party vehicles or objects can be described, assuming a constant measured acceleration $\ddot{S}_{obj,0}$ on the basis of the measured starting speed $\dot{S}_{obj,0}$ and starting position $S_{obj,0}$, by $$\dot{s}_{obj}(t) = \dot{s}_{obj,0} + \ddot{s}_{obj,0} \cdot t$$

for $$t < t_{konst} \quad (1)$$

and $$\dot{s}_{obj}(t) = \dot{s}_{obj,0} + \ddot{s}_{obj,0} \cdot t_{konst}$$

for $$t \geq t_{konst} \quad (2)$$

Accordingly, the following results for the position $$s_{obj}(t) = s_{obj,0} + \dot{s}_{obj,0} \cdot t + \frac{1}{2} \cdot \ddot{s}_{obj,0} \cdot t^2 \text{ for } t < t_{konst} \quad (3)$$

and $$s_{obj}(t) = s_{obj,0} + \dot{s}_{obj,0} \cdot t_{konst} + \frac{1}{2} \cdot \ddot{s}_{obj,0} \cdot t_{konst}^2 + (\dot{s}_{obj,0} + \ddot{s}_{obj,0} \cdot t_{konst}) \cdot (t - t_{konst}) \quad (4)$$

for $t \geq t_{konst}$.

In a similar manner, the ego-vehicle movement results as $$\dot{s}_{ego}(t) = \dot{s}_{ego,0} + \ddot{s}_{ego,0} \cdot t \quad (5)$$

and $$s_{ego}(t) = s_{ego,0} + \dot{s}_{ego,0} \cdot t + \frac{1}{2} \cdot \ddot{s}_{ego,0} \cdot t^2. \quad (6)$$

The method 200 can be carried out for one or more lanes of a road which can be traveled on. The objects for which the method 200 is carried out can depend on a predefined maneuver. Possible maneuvers may be lane keeping or a lane change of the ego-vehicle. The method 200 may also consider objects which enter a maneuvering space of the ego-vehicle. If, for example, an object enters a traffic lane of the ego-vehicle, the method 200 can be carried out for this object. The number of objects for which the method 200 is carried out can be efficiently reduced by selecting the objects in a maneuver-dependent manner.

For a lane, a vehicle traveling in front and a predicted trajectory to the vehicle traveling in front can be determined. A necessary trajectory can be derived from the predicted trajectory with the aid of a distance law. For example, the 2 s rule which is conventional in road traffic can be used to calculate a target trajectory in order to calculate a safety distance. The 2 s rule states that a distance traveled in 2 seconds should be selected as the safety distance between two vehicles outside built-up areas. For example, the 2 s rule which is conventional in road traffic can be used and the target trajectory can be calculated 206 with $$S_{ziel,i}(t) = S_{obj,i}(t) - S_{static} - 2 \cdot \dot{S}_{obj,i}(t) \quad (7).$$

In this case, the parameter $s_{static}$ describes a safety distance to be complied with when at a standstill. If there is no vehicle traveling in front, a virtual phantom object can be assumed at the edge of the detection range of the environment sensor system. This vehicle is assumed to have a worst-case speed and therefore makes it possible to avoid so-called inevitable collision states, ICS for short. These states describe situations in which a collision can no longer be avoided, regardless of which trajectory is planned.

The method 200 can first of all check a longitudinal movement and can then optionally superimpose a lateral movement on this longitudinal movement. For the longitudinal movement, it is necessary to decide whether there should be a reaction to a vehicle traveling in front, that is to say whether there is follow-on travel, or whether there should be guidance to a predefined target speed, for example a predefined desired speed, that is to say whether there is free travel. The period for catching up with the respective vehicle traveling in front can result from a consideration of the relative speed between the ego-vehicle 102 and one of the third-party vehicles 104, 106, 108. The target trajectory (7) can be used in this case. At the end of a maneuver, that is to say at the time $t_{e,\,s,\,i}$, the differential speed should have decreased. The following requirement therefore results $$\dot{s}_{rel}(t=t_{e,\,s,\,i}) = \dot{s}_{obj,i}(t=t_{e,\,s,\,i}) - \dot{s}_{ego}(t=t_{e,\,s,\,i}) \stackrel{!}{=} 0 \quad (8).$$

Figure 3:
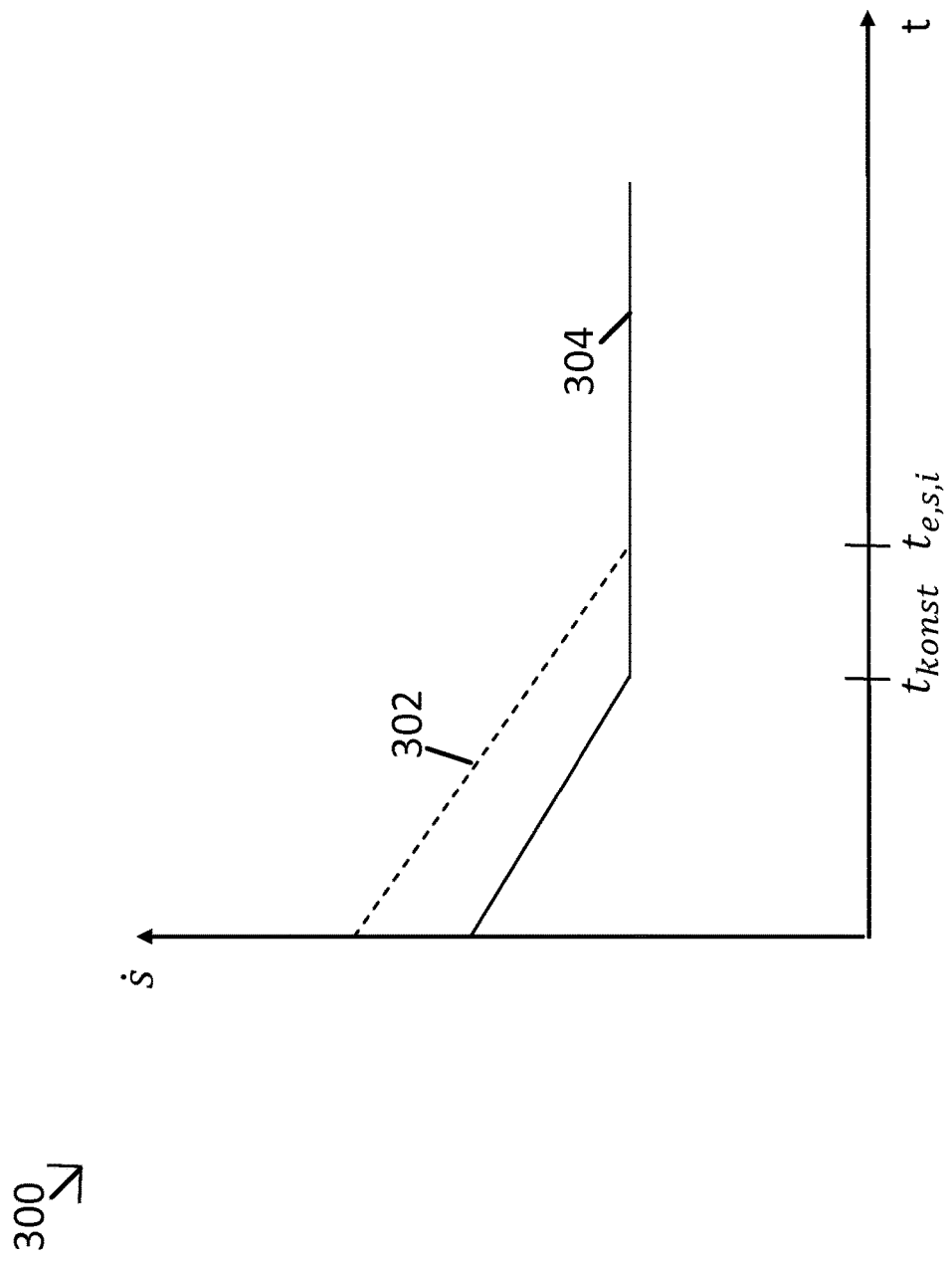
FIG. 3 schematically shows an exemplary speed profile between an ego-vehicle and an object.

The speed of the ego-vehicle $\dot{S}_{ego,0}$ results according to (5). For $\ddot{S}_{ego,0}$, an average deceleration or an average acceleration $\ddot{S}_{apx}$, depending on whether the instantaneous differential speed is negative or positive, is considered:

$$\ddot{s}_{apx} = \begin{cases} \ddot{s}_{max-} & \text{for } \dot{s}_{rel} \leq 0 \\ \ddot{s}_{max+} & \text{for } \dot{s}_{rel} > 0 \end{cases} \quad (9)$$

where $\ddot{s}_{max+}$ is the average acceleration of the ego-vehicle 102 and $\ddot{s}_{max-}$ is the average deceleration of the ego-vehicle 102. Solving (8) makes it possible to calculate 208 the maneuvering period $t_{e,s,i}$ and/or an end time of the maneuver. This value corresponds to a time-to-collision, TTC for short. If the value is negative, the maneuver may be impossible and may be excluded from the solution space. In the case of a plurality of positive solutions, the value having the smallest absolute value can be selected. FIG. 3 shows an exemplary speed profile 300 on the basis of a movement model of an object and a movement model of the ego-vehicle. The ego-vehicle 102 decelerates with an average deceleration, with the result that the speed of the ego-vehicle continuously decreases (see 302). The object decelerates continuously until a predefined time $t_{konst}$ and then keeps the speed (see 304). At the time $t_{e,s,i}$, the speed profiles of the ego-vehicle and of the object intersect. At this time, that is to say at the time $t_{e,s,i}$, the method 200 can check whether a distance between the ego-vehicle and the object corresponds to the predefined safety distance of the target trajectory. The distance can be calculated, for example, using the formula (10), see below. If the distance violates the predefined safety distance, that is to say the distance is equal to the predefined safety distance or undershoots the predefined safety distance, the ego-vehicle can change over to follow-on travel.

The necessary distance for the maneuver can result or can be calculated 210 by inserting the maneuvering period into the equation of the differential distance:

$$s_{rel}(t=t_{e,s,i})=s_{ziel,i}(t)-s_{ego}(t) \qquad (10).$$

A reaction to the object by means of a deceleration or acceleration may therefore be necessary only when this equation becomes 0. If the equation (10) becomes 0, the ego-vehicle 102 is in the follow-on travel mode and the object speed can be selected 212 as the target speed. The method 200 can transmit 214 the target speed to the trajectory planning process for calculating a follow-on travel trajectory. The trajectory planning process may plan one or more follow-on travel trajectories, along which the vehicle can travel.

Figure 4:
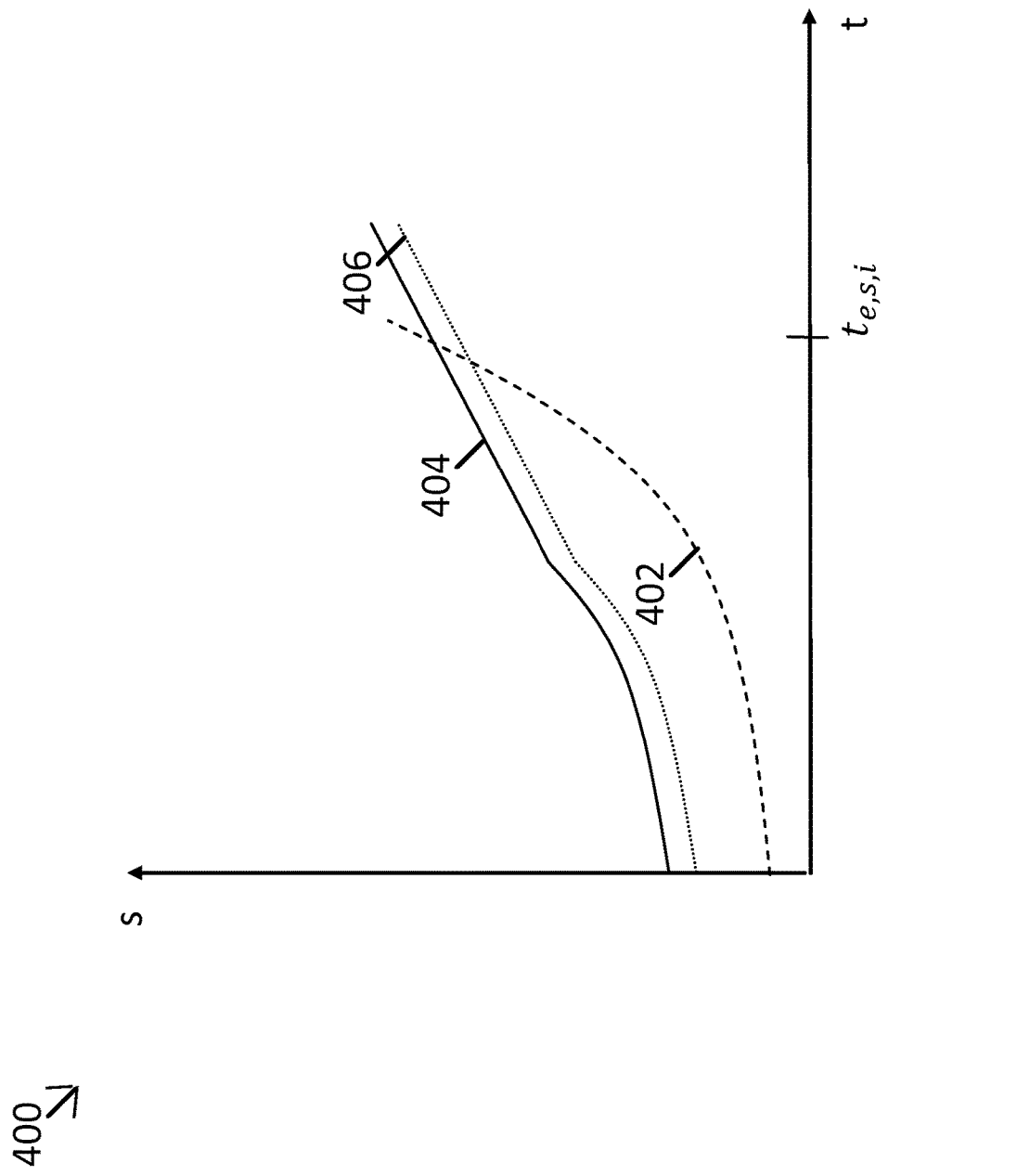
FIG. 4 schematically shows an exemplary profile of trajectories of an ego-vehicle and of an object.

FIG. 4 shows exemplary trajectory profiles 400 with respect to a maneuver of an ego-vehicle using the movement models of the ego-vehicle 102 and of an object, for example one of the third-party vehicles 104 to 110. 402 shows a trajectory of the maneuver of the ego-vehicle, 404 shows a predicted trajectory of the object and 406 shows a target trajectory including a safety distance. As illustrated in FIG. 4, the distance between the trajectory of the ego-vehicle 102 and the target trajectory at the end time $t_{e,s,i}$ of the maneuver is equal to 0, that is to say the distance is equal to the predefined safety distance. The ego-vehicle can change or switch to a follow-on travel mode.

As long as the vehicle traveling front is still too far away for follow-on travel and the differential distance $s_{rel}$ is greater than 0 or if there is no vehicle traveling in front or the desired speed is below the object speed, it is possible to accelerate or brake to the target speed $\dot{s}_{desired}$. The desired speed may result from a driver specification or a higher-level driver assistance system. In order to determine the desired speed, a future road curvature $K_S$ can be taken into account, for example, in order to possibly limit $\dot{s}_{desired}$:

$$\dot{s}_{desired}=\min(\dot{s}_{desired}, \sqrt{\mu g \cdot 1/K_S}) \qquad (11).$$

A maximum bend limit speed may result on the basis of the coefficient of friction μ. Alternatively, a maximum lateral acceleration can be used instead of μg. A necessary maneuvering period may likewise be calculated for the resulting desired speed:

$$t_{e,s,i} = \frac{|\dot{s}_{desired} - \dot{s}_{ego,0}|}{\ddot{s}_{apx}}. \qquad (12)$$

In this case too, an average acceleration $\ddot{s}_{apx}$ can be assumed. Depending on whether deceleration or acceleration is intended to be carried out, a negative or positive value can be selected for the average acceleration:

$$\ddot{s}_{apx} = \begin{cases} \ddot{s}_{max-} & \text{for } \dot{s}_{desired} \leq \dot{s}_{ego,0} \\ \ddot{s}_{max+} & \text{for } \dot{s}_{desired} > \dot{s}_{ego,0} \end{cases}. \qquad (13)$$

If the current lane i under consideration does not correspond to the current traffic lane, a lateral movement of the lane change can be superimposed on the calculated longitudinal movement. For a lane change to the lane i, the minimum time results from $$t_{e,d,i} = \sqrt{\frac{2 \cdot |d_i - d_{ego,0}|}{\ddot{d}_{apx}}}. \qquad (14)$$

In this case, $d_i$ corresponds to the target lateral offset of the selected target lane, $d_{ego,0}$ corresponds to the measured lateral offset and $\ddot{d}_{apx}$ corresponds to the desired average lateral acceleration. In this case, a vehicle coming from behind can be taken into account. A simple distance law can be used to check whether the lane change is possible. A phantom object may likewise be assumed for a vehicle coming from behind.

The method can be carried out for the current lane and/or for further lanes around the current lane. The optimum maneuver can be selected on the basis of the following cost functional or the following assessment function:

$$J_i=k_{track}(i_{ziel}-i)^2+k_v(\dot{S}_{desired}-\dot{S}_i)^2 \qquad (15).$$

The cost functional or the assessment function allows weighting between deviations from the target speed $\dot{S}_{desired}$ and deviations from the target lane $i_{ziel}$. In this case, the parameter $k_{spur}$ is the weighting factor for the deviation between the target lane and the selected lane and $k_v$ is the weighting factor for deviations between the target speed and the selected speed $\dot{S}_i$. Maneuvers which are not possible, for example maneuvers with negative target times, are not taken into account. If a possible maneuver is not found, the algorithm can be carried out again with increased accelerations or decelerations, for example, in order to assess safety maneuvers or to initiate an emergency maneuver. The maneuver which is most favorable in the sense of the cost functional can be passed to the lower-level trajectory planning process so that the trajectory planning process can plan one or more free travel trajectories for the ego-vehicle.

The method 200 makes it possible to limit possible trajectories, along which the ego-vehicle 102 can travel, to trajectories which end in the current traffic lane of the ego-vehicle or which end in the right-hand traffic lane of the ego-vehicle. It is therefore possible to avoid calculating trajectories which end in the left-hand traffic lane in the example from FIG. 1. Taking into account the maximum possible decelerations also makes it possible to estimate the time horizon of the trajectories. Trajectories which must build up or reduce large differential speeds within a very short time may likewise be excluded, like lane changes in intervals of time which are excessively short. Therefore, a lane change to the right-hand neighboring lane may result as a solution in the example from FIG. 1.

The method 200 can advantageously efficiently predictively determine follow-on travel or free travel of the ego-vehicle using a movement model. As a result, the trajectory planning process can calculate trajectories precisely for a particular travel mode. It is no longer necessary to consider the respective other travel mode. The trajectory planning process can therefore be carried out in a more efficient manner, in particular in a more resource-efficient manner, in control devices.

LIST OF REFERENCE SYMBOLS

100 Traffic situation
102 Ego-vehicle
104 Third-party vehicle
106 Third-party vehicle
108 Third-party vehicle
110 Phantom vehicle
200 Method
202 Determine a longitudinal movement of an ego-vehicle
204 Determine a longitudinal movement of an object
206 Calculate a target trajectory
208 Calculate an end time of a maneuver
210 Calculate a distance at the calculated end time
212 Set the target speed
214 Transfer/transmit the target speed to a trajectory planning process
300 Exemplary speed profile
302 Speed profile of an ego-vehicle
304 Speed profile of an object
400 Trajectory profile
402 Trajectory of a maneuver
404 Predicted trajectory
406 Target trajectory The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for controlling a trajectory planning process of an ego-vehicle, the method comprising the steps of:
   determining a longitudinal movement of the ego-vehicle, the longitudinal movement comprising a speed of the ego-vehicle;
   determining a longitudinal movement of an object, the longitudinal movement comprising a speed of the object;
   calculating a target trajectory of the object on the basis of a predicted trajectory of the object;
   calculating an end time of a maneuver of the ego-vehicle, wherein the end time of the maneuver is a time at which a differential speed between the ego-vehicle and the object has decreased;
   calculating a distance between a position of the ego-vehicle and a position of the object with respect to the calculated target trajectory at the calculated end time of the maneuver of the ego-vehicle; and
   when the calculated distance of the ego-vehicle at the calculated end time of the maneuver is equal to a predefined threshold value or undershoots a predefined threshold value, then:
   (a) setting the determined speed of the object as the target speed of the ego-vehicle; and
   (b) transmitting the target speed to the trajectory planning process for calculating a follow-on travel trajectory for the ego-vehicle.

2. The method as claimed in claim 1, wherein
   the predicted trajectory is determined on the basis of a predefined movement model of the object on the basis of the determined longitudinal movement of the object;
   the target trajectory takes into account a safety distance to the object; and/or
   the predefined threshold value corresponds to the safety distance.

3. The method as claimed in claim 1, wherein
   the end time of the maneuver is calculated on the basis of a movement model of the object and a movement model for the ego-vehicle.

4. The method as claimed in claim 3, wherein
   the movement model of the object maintains an acceleration of the object constant until a predefined time and sets the acceleration to zero after the predefined time; and
   the movement model of the ego-vehicle maintains a predefined average acceleration of the ego-vehicle until the end time of the maneuver.

5. The method as claimed in claim 1, wherein
   the position of the ego-vehicle is calculated by the movement model of the ego-vehicle on the basis of the determined longitudinal movement of the ego-vehicle at the end time of the maneuver; and
   the position of the object is calculated by the movement model of the object on the basis of the determined longitudinal movement of the object at the end time of the maneuver.

6. The method as claimed in claim 1, the method further comprising the steps of:
   receiving a desired speed of the ego-vehicle; and
   if the desired speed of the ego-vehicle is less than the speed of the object and/or the calculated distance of the ego-vehicle at the calculated end time of the maneuver exceeds a predefined threshold value,
   setting the desired speed as the target speed of the ego-vehicle.

7. The method as claimed in claim 6, the method further comprising the steps of:
   receiving a desired speed of the ego-vehicle; and
   if the desired speed of the ego-vehicle is greater than or equal to the speed of the object and/or the calculated distance of the ego-vehicle at the calculated end time of the maneuver is equal to a predefined threshold value or undershoots a predefined threshold value,
   setting the speed of the object as the target speed of the ego-vehicle.

8. The method as claimed in claim 6, the method further comprising the step of:
   transmitting the target speed to a trajectory planning process for calculating a free travel trajectory for the ego-vehicle if the desired speed of the ego-vehicle is less than the speed of the object or the calculated distance of the ego-vehicle at the calculated end time of the maneuver exceeds the predefined threshold value.

9. The method as claimed in claim 1, the method further comprising the steps of:
   receiving a desired speed of the ego-vehicle; and
   if the desired speed of the ego-vehicle is greater than or equal to the speed of the object and/or the calculated distance of the ego-vehicle at the calculated end time of the maneuver is equal to a predefined threshold value or undershoots a predefined threshold value,
setting the speed of the object as the target speed of the ego-vehicle.

10. A computer program product for controlling a trajectory planning process of an ego-vehicle, comprising a non-transitory computer readable medium having stored thereon program code sections that, when executed by one or more computers of the ego-vehicle, operate to:
determine a longitudinal movement of the ego-vehicle, the longitudinal movement comprising a speed of the ego-vehicle;
determine a longitudinal movement of an object, the longitudinal movement comprising a speed of the object;
calculate a target trajectory of the object on the basis of a predicted trajectory of the object;
calculate an end time of a maneuver of the ego-vehicle, wherein the end time of the maneuver is a time at which a differential speed between the ego-vehicle and the object has decreased;
calculate a distance between a position of the ego-vehicle and a position of the object with respect to the calculated target trajectory at the calculated end time of the maneuver of the ego-vehicle; and
when the calculated distance of the ego-vehicle at the calculated end time of the maneuver is equal to a predefined threshold value or undershoots a predefined threshold value, then:
(a) set the determined speed of the object as the target speed of the ego-vehicle; and
(b) transmit the target speed to the trajectory planning process for calculating a follow-on travel trajectory for the ego-vehicle.

11. A device for controlling a trajectory planning process of an ego-vehicle, the device comprising:
one or more control devices or computers of the ego-vehicle which execute program code sections to:
determine a longitudinal movement of the ego-vehicle, the longitudinal movement comprising a speed of the ego-vehicle;
determine a longitudinal movement of an object, the longitudinal movement comprising a speed of the object;
calculate a target trajectory of the object on the basis of a predicted trajectory of the object;
calculate an end time of a maneuver of the ego-vehicle, wherein the end time of the maneuver is a time at which a differential speed between the ego-vehicle and the object has decreased;
calculate a distance between a position of the ego-vehicle and a position of the object with respect to the calculated target trajectory at the calculated end time of the maneuver of the ego-vehicle; and
when the calculated distance of the ego-vehicle at the calculated end time of the maneuver is equal to a predefined threshold value or undershoots a predefined threshold value, then:
(a) set the determined speed of the object as the target speed of the ego-vehicle; and
(b) transmit the target speed to the trajectory planning process for calculating a follow-on travel trajectory for the ego-vehicle.

12. A vehicle, comprising:
a device for controlling a trajectory planning process, the device comprising:
one or more control devices or computers of the ego-vehicle which execute program code sections to:
determine a longitudinal movement of the ego-vehicle, the longitudinal movement comprising a speed of the ego-vehicle;
determine a longitudinal movement of an object, the longitudinal movement comprising a speed of the object;
calculate a target trajectory of the object on the basis of a predicted trajectory of the object;
calculate an end time of a maneuver of the ego-vehicle, wherein the end time of the maneuver is a time at which a differential speed between the ego-vehicle and the object has decreased;
calculate a distance between a position of the ego-vehicle and a position of the object with respect to the calculated target trajectory at the calculated end time of the maneuver of the ego-vehicle; and
when the calculated distance of the ego-vehicle at the calculated end time of the maneuver is equal to a predefined threshold value or undershoots a predefined threshold value, then:
(a) set the determined speed of the object as the target speed of the ego-vehicle; and
(b) transmit the target speed to the trajectory planning process for calculating a follow-on travel trajectory for the ego-vehicle.

* * * * *